(No Model.) 8 Sheets—Sheet 1.
P. F. COX.
MACHINE FOR DISCARDING LEADS, SPACES, AND QUADS FROM DEAD MATTER.

No. 604,305. Patented May 17, 1898.

(No Model.) 8 Sheets—Sheet 2.

P. F. COX.
MACHINE FOR DISCARDING LEADS, SPACES, AND QUADS FROM DEAD MATTER.

No. 604,305. Patented May 17, 1898.

Fig. 2.

Witnesses
Jos. C. Stack
L. J. Roerth

Inventor
Paul F. Cox
by Alexander & Dowell
Attys.

(No Model.)　　　　　　　　　　　　　　　　　8 Sheets—Sheet 4.
P. F. COX.
MACHINE FOR DISCARDING LEADS, SPACES, AND QUADS FROM DEAD MATTER.

No. 604,305.　　　　　　　　　　　　Patented May 17, 1898.

(No Model.)  
8 Sheets—Sheet 5.

P. F. COX.
MACHINE FOR DISCARDING LEADS, SPACES, AND QUADS FROM DEAD MATTER.

No. 604,305.  
Patented May 17, 1898.

Fig. 5

Witnesses  
Jos. C. Stock  
F. J. Koerth

Inventor  
Paul F. Cox.  
by Alexander & Lowell  
Attys (No Model.) 8 Sheets—Sheet 7.

P. F. COX.
MACHINE FOR DISCARDING LEADS, SPACES, AND QUADS FROM DEAD MATTER.

No. 604,305. Patented May 17, 1898.

Witnesses
Jos. C. Stock
F. J. Koerth

Inventor
Paul F. Cox
by
Alexander & Dowell
Attorneys (No Model.) 8 Sheets—Sheet 8.

P. F. COX.
MACHINE FOR DISCARDING LEADS, SPACES, AND QUADS FROM DEAD MATTER.

No. 604,305. Patented May 17, 1898.

Witnesses
Jos. C. Stock.
F. J. Kourth

Inventor
Paul F. Cox.
by Alexander & Dowell
Attys

UNITED STATES PATENT OFFICE.

PAUL FLEMMING COX, OF CHICAGO, ILLINOIS, ASSIGNOR TO THE COX TYPE SETTING MACHINE COMPANY, OF SAME PLACE.

MACHINE FOR DISCARDING LEADS, SPACES, AND QUADS FROM DEAD-MATTER.

SPECIFICATION forming part of Letters Patent No. 604,305, dated May 17, 1898.

Application filed November 30, 1897. Serial No. 660,226. (No model.)

*To all whom it may concern:*

Be it known that I, PAUL FLEMMING COX, of Chicago, in the county of Cook and State of Illinois, have invented certain new and useful Improvements in Machines for Discarding Leads, Spaces, and Quads from Dead-Matter; and I hereby declare that the following is a full, clear, and exact description thereof, reference being had to the accompanying drawings, which form part of this specification.

This invention relates to type-distributing apparatus, and has especial reference to means for separating the lines of type from dead-matter, removing the leads from said lines, and subsequently separating the spaces and quads from the type, then separating the spaces from the quads, and finally collecting the separated leads, spaces, and quads separately, so that the face-type can be more rapidly distributed by machinery or hand after the dead-matter has been passed through the machine.

The invention is more particularly an improvement upon the means for removing leads from the dead-matter and for separating the spaces and quads from the type prior to distribution shown in my Letters Patent No. 550,553, dated November 26, 1895, and like said patent is especially designed for use in connection with machines using compressible spaces—such as are shown, for example, in my Patents No. 534,550, dated February 19, 1895, and No. 581,954, dated May 4, 1897.

The invention, briefly stated, consists in the following more important improvements upon my Patent No. 550,553: first, in making the dead-matter galley adjustable, so that it can be set to properly accommodate various widths of matter; second, in improved mechanism by which the leads are removed from the dead-matter by drawing them down below the galley and are stacked thereunder; third, in improved mechanism whereby the lines of type are lifted above the galley and forwarded intermittently and, if desired, step by step past the discarding mechanism; fourth, in the improved construction and arrangement of the feelers, whereby should any one of them become broken or disarranged it can be readily removed and replaced without interfering with the others and whereby the feelers and the actuating-springs can be more readily assembled; fifth, in improved mechanism for positively moving any feelers which have found a space or quad, so as to eject the latter or tilt them out of the line of type.

The invention further consists in, sixth, a novel mechanism for insuring the positive and complete ejection of spaces and quads from the line of type after they have been pushed out by the feelers, if they should be hung by contact with adjoining type, and, seventh, a novel means for separating the spaces from the quads, this feature of the invention being particularly useful where compressible spaces are employed, as in my said patent, as such spaces when once used are practically useless, while the quads can be used repeatedly.

Further, the invention embodies novel mechanism whereby the quads may be ultimately assembled in one of the removable type channels or holders described in my Patent No. 581,954, above mentioned, which holder when filled can be immediately placed upon the type-setting machine. The type from which the leads, spaces, and quads have been discarded can be also automatically assembled in like type-channels, as described in my said Patent No. 550,553.

The invention will be summarized in the claims appended hereto, and without further general description of the invention I will proceed to describe the same as illustrated in the accompanying drawings, which embody a complete and satisfactorily operative apparatus that I consider the best now known to me embodying my several improvements.

In the accompanying drawings.

Referring to said drawings, A designates the galley for receiving the "dead-matter" or type to be distributed, which is supported in a preferably horizontal position on the frame of the machine and provided with one adjustable side $A'$, which is held in position by means of slotted guides $a$, attached to the outer face of sides $A'$, the lower parts $a'$ of which extend under the bottom of the galley and are dovetailed in cross-section and engage transverse dovetailed grooves $a^2$ in the bottom of the galley, as shown. This construction permits the side $A'$ to be moved toward or from the fixed side of the galley, so as to narrow or widen the latter, and accordingly permit it to be adjusted to suit columns of type of various width—such as thirteen-em or twenty-six-em columns, for instance.

When properly adjusted, the side $A'$ may be fixed in position by means of the clamping-bolts $a^3$, passing through openings in the upper part of the guides $a$ and tapped into the lower parts thereof, as shown.

Figure 5:
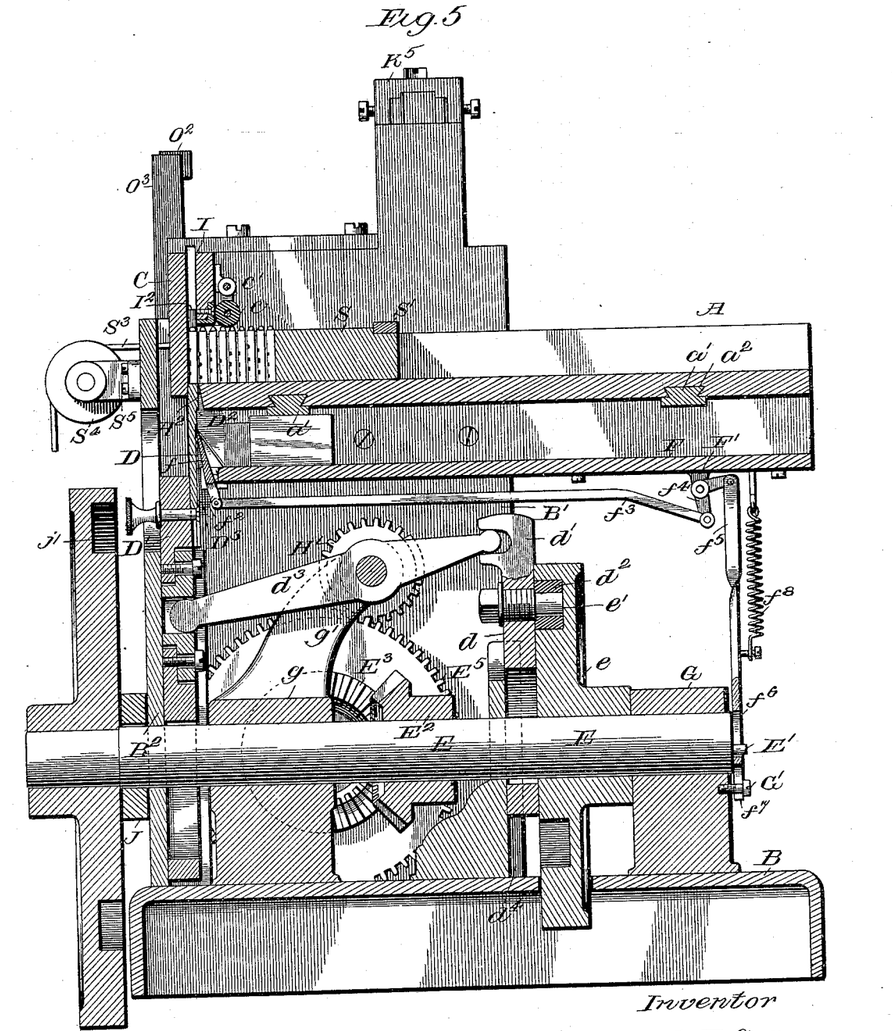
Fig. 5 is a transverse section on line 5 5, Fig. 1, enlarged.
Figures 6, 16:
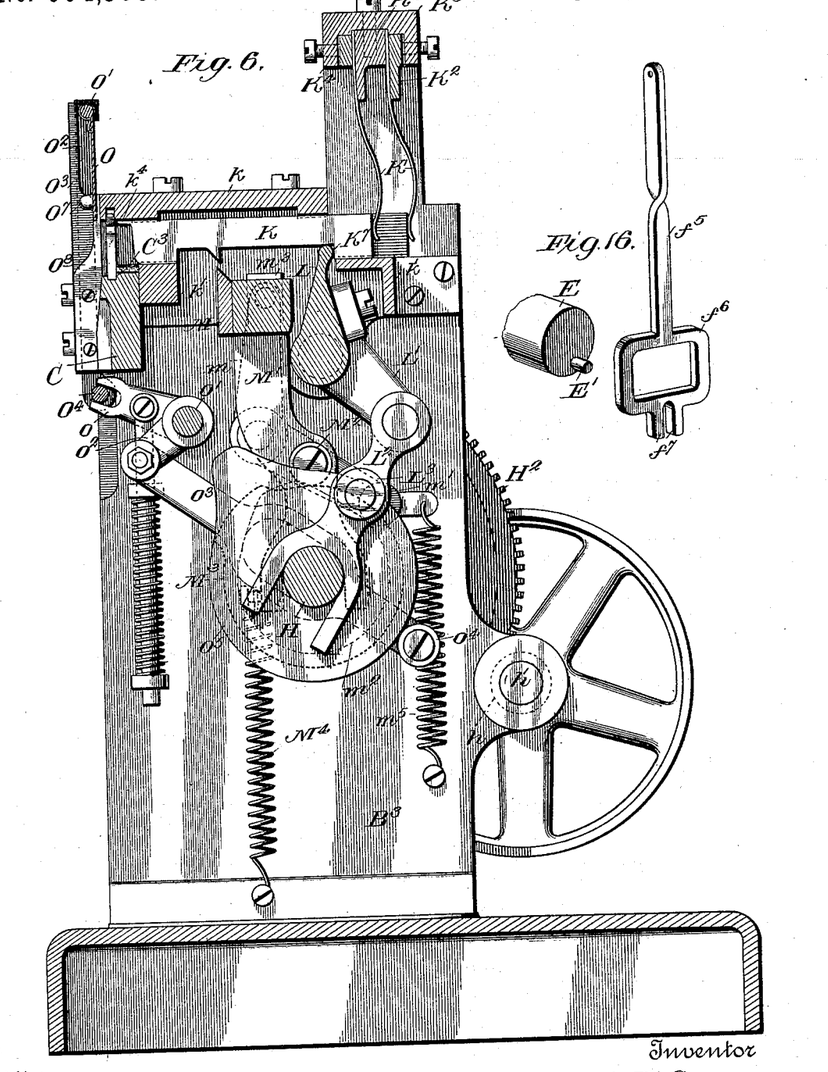
Figs. 6 and 7 are enlarged transverse sections on line 6 7, Fig. 4, looking in the direction of the arrows, but showing the parts in different positions.
Fig. 16 is a detail perspective view of part of the lead-stacker-plate-operating devices.
Figure 7:
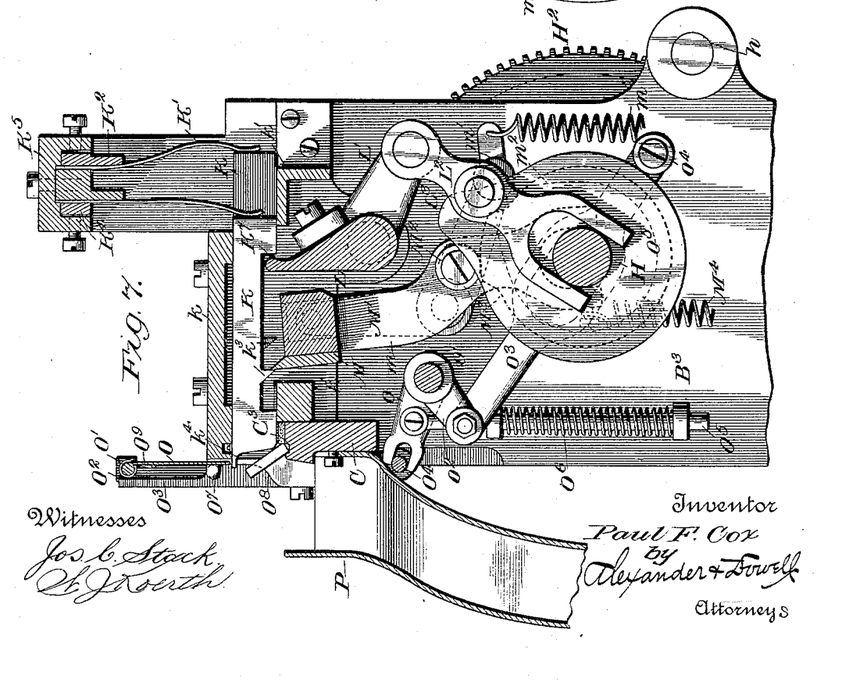

The fixed side of the galley is fastened to a vertical standard rising from the base $B'$ of the machine. The rear end of the galley is closed by a casting C, hereinafter referred to, and in the bottom of the galley, at the rear thereof, is a transverse slot $A^2$, which is equal in thickness to the thickness of a line of type, and through said slot works a plate D, detachably fastened to the upper end of a vertically-movable plunger $D'$, which moves in slotted guides in a plate $B^2$, fastened to the rear edge of standard $B'$ and the base B, as shown in Fig. 5. This plunger is raised and lowered by means of an oscillating lever $d^3$, fulcrumed on an arm $g'$, rising from a journal-casting $g$, attached to the base B beneath the galley, as shown.

The forward end of lever $d^3$ engages the bifurcated upper end $d'$ of a vertically-movable slide $d$, which is guided in a slotted casting $d^4$, attached to the base, and is provided with a friction-roller $d^2$, which engages a cam-groove $e'$ in a face-cam $e$, keyed on a transverse shaft E, which underlies the galley and is journaled in bearing G $g$, attached to the base and plate, as shown in Fig. 5. The shaft passes through the guide $d^4$ and slide $d$, they being suitably slotted to permit this.

When the plate D is in its lowermost position, its top is just flush with the bottom of galley A, and when in its uppermost position its top is more than type high above the bottom of the galley and just flush with the bottom of a type-holding channel I in casting C, as shown. The plate D is detachably secured to the plunger in any suitable manner, and interchangeable plates may be used, according as to whether the matter is leaded or not. When working on leaded matter, a plate should be used having a ledge $D^2$ on its front face near its upper end, which is adapted to engage a "lead" and draw the same downward through the slot $A^2$ when the plunger descends. With "solid" matter a plate of uniform thickness should be used, and on "double-leaded" matter a plate with a ledge wide enough to catch both leads should be employed. In the front face of the plate below ledge $D^2$ are shown vertical grooves $D^3$, into which when the plunger is in its uppermost position project fingers $f'$ on the upper edge of an oscillating stacker-plate $f$, which lies transversely of the galley below slot $A^2$ and is suitably fulcrumed on the rear end of a shelf F, which lies parallel with but below the galley. The stacker $f$ has a depending arm $f^2$, which is connected to one end of a rod $f^3$, the front end of which is pivoted to one arm of a bell-crank lever $f^4$, pivoted to a lug $F'$ on the bottom of plate F, just above the journal-casting G. The other arm of lever $f^4$ is pivoted to the upper end of a rod $f^5$, which depends beside the front end of shaft E and has a loop $f^6$ on its lower end, in which works an eccentric-pin $E'$ on the end of shaft E, and consequently the stacker $f$ is operated once for each revolution of said shaft.

Rod $f^5$ is guided and held in position by means of lugs $f^7$ on its lower end engaged by a tap-bolt $G'$ on bearing G, and it is normally pulled upward by means of a spring $f^8$, connected at one end to the rod and at the other end to plate F, as shown in Fig. 5. The spring $f^8$ normally tends to keep the pins $f'$ of the stacker in engagement with the grooves $D^3$ in plate D, so that as the leads descend these fingers strip them from the plate D and direct them onto plate F, and then when rod $f^5$ is depressed the stacker forces the leads forward on plate F, and thus they are successively stacked upon the plate as they are lowered.

The shaft E is driven by means of a beveled gear $E^2$, meshing with a similar bevel $E^3$ on a stub-shaft $E^4$, fixed to standard $B'$, said stub-shaft carrying a gear $E^5$, meshing with a pinion $H'$ on the end of a shaft H, which lies at right angles to and above shaft E and is journaled in standard $B'$ and a like parallel standard $B^3$ near the right-hand end of the base. Shaft H has a gear $H^2$ on its right end meshing with a pinion $h$ on a counter-shaft $h'$, which is suitably journaled in bearings on standard $B^3$ and in a bracket $B^4$, attached to the base and provided with fast and loose pulleys, to which the prime motor may be belted.

In galley A is a removable follower S, to which is attached a bar $S'$, the ends of which project beyond the sides of the galley and are connected to cords $S^3$, which extend through openings in casting C, over idler-pulleys $S^4$ in brackets $S^5$, fastened to the rear face of plate B², said cords being connected to a bar S⁶, to which a weight S⁷ is attached. Different-width followers can be attached to bar S', according to the width to which the galley is adjusted.

A roller $c$ is suspended by hangers $c'$ directly above galley A and in front of casting C, and as the lines of type are passed under this roller before they come to the slot A² the type is thereby pressed down into proper alinement before they are lifted into the type channel or holder.

Above galley A and extending at right angles thereto is a type-channel I, which is formed in casting C and is directly over the plate D, and when the latter is in its highest position its top enters a slot I² in the bottom of said channel and is flush therewith. The casting C extends to the left of the galley also, and in the channel therein is fitted a plunger I', which is adapted to move the type along the channel I. When fully moved to the left, it is out of the way of plate D or the line of type raised thereby, but when moved to the right it will propel the line of type raised by plate D to the right sufficiently to be out of the way of the next line of type raised by said plate.

Figure 1:
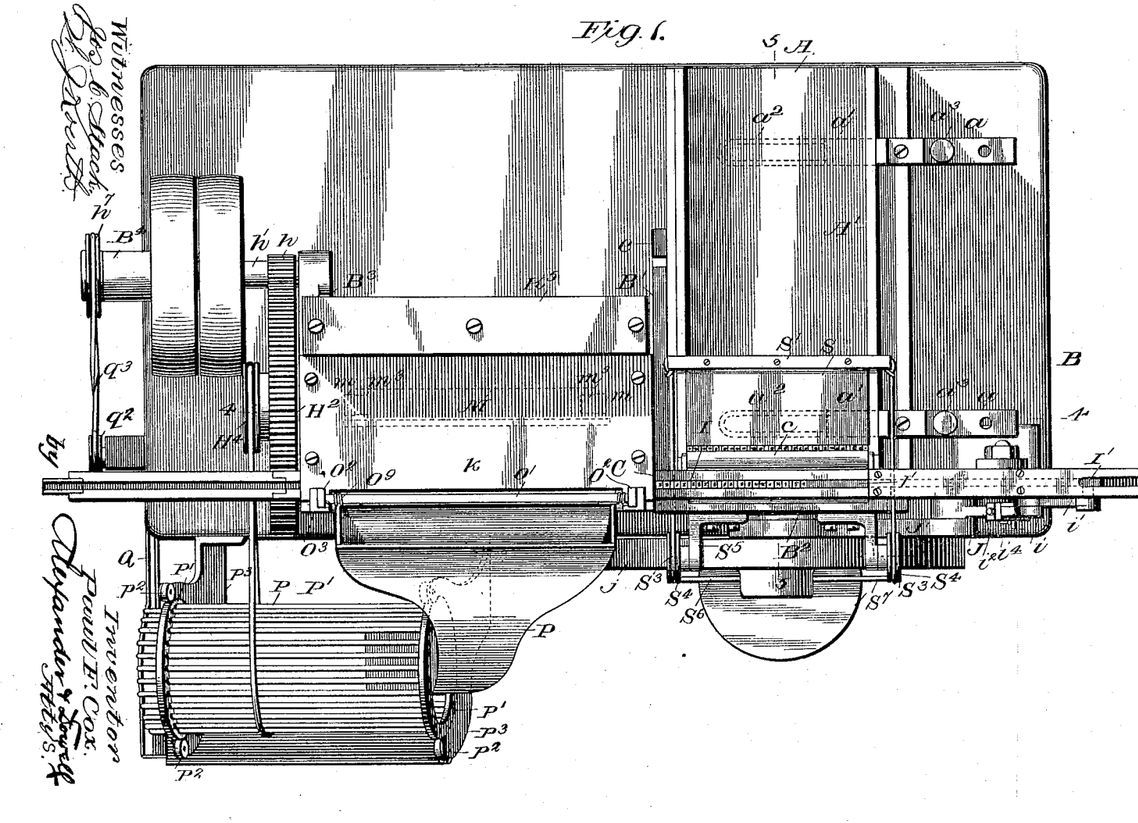
Figure 1 is a top plan of the machine.
Figure 2:
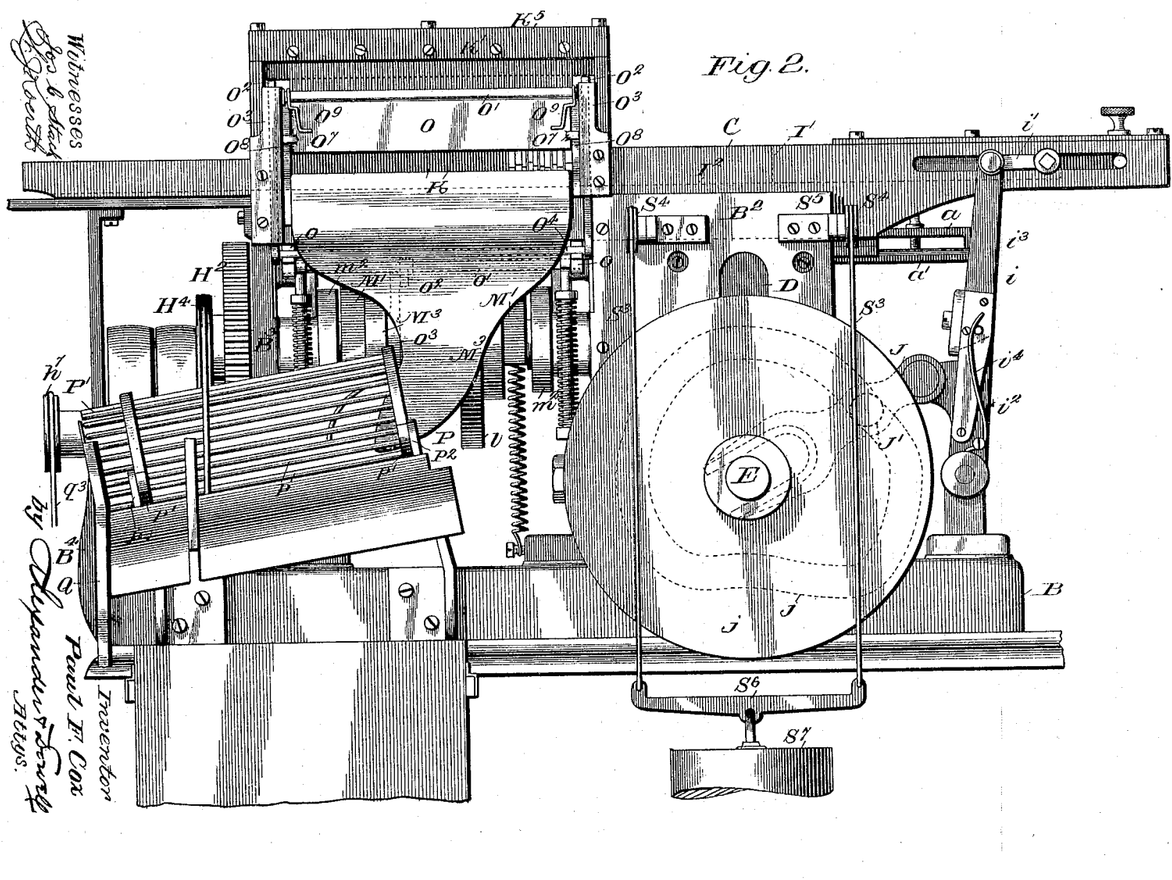
Fig. 2 is a rear elevation thereof.
Figure 3:
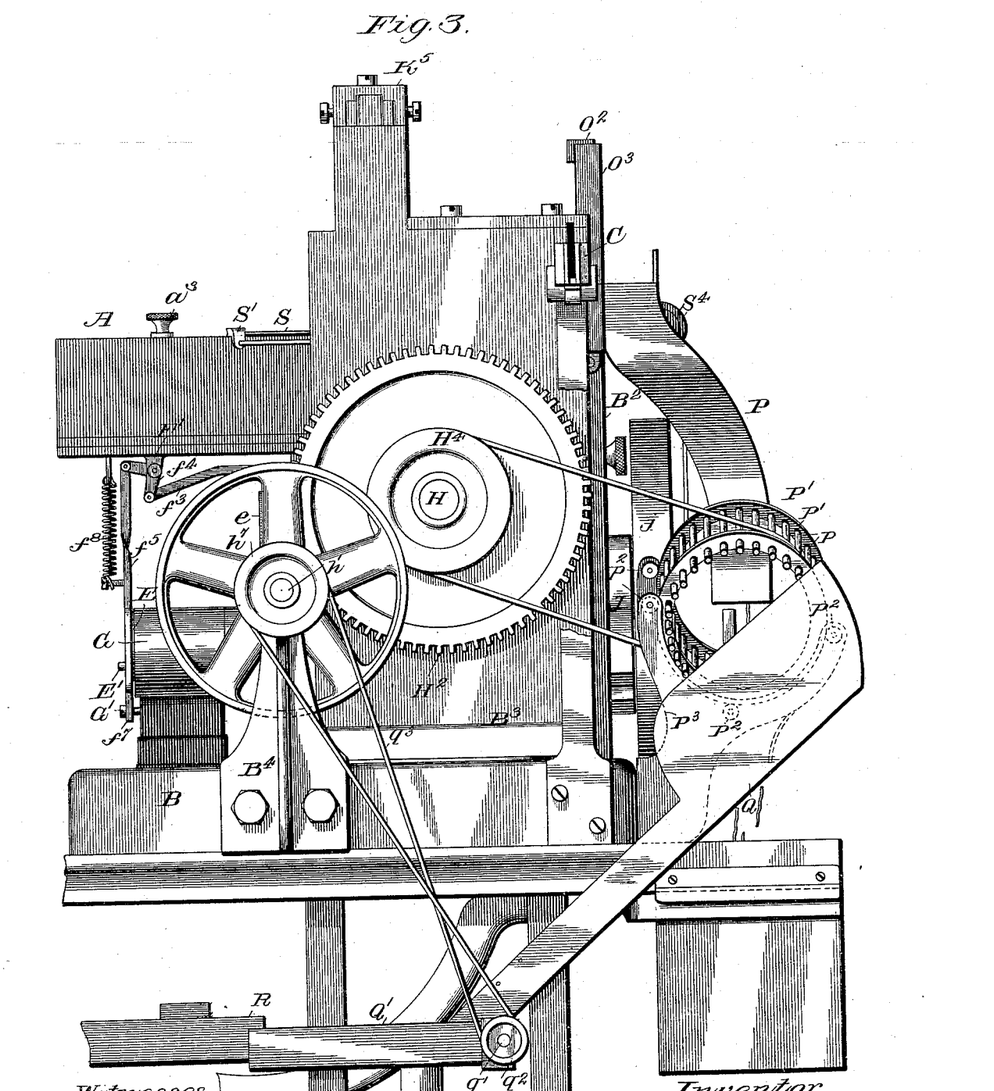
Fig. 3 is an elevation of the right-hand end of the machine.

Plunger I' is operated by means of a vibrating lever $i$, pivoted on a stud fastened to the base, and its upper edge is connected by a link $i'$ to plunger I'. Its lower portion above its pivot is connected to a cam-link J, the inner end of which is slotted and embraces shaft E, so as to be guided thereby, and said link is provided with a friction-roller J', which runs in the groove $j'$ of a cam-disk on the rear end of shaft E, as shown in Fig. 2. The groove $j'$ is preferably formed so that plunger I' will be retracted quickly and uniformly, but will be moved forward slowly and preferably intermittently or step by step, so that the line of type is given several impulses forward for one stroke of plunger I'.

As shown, the lever $i$ is made up of two parts, the lower part $i^2$ being pivoted on the base and connected to link J, and it always has a certain extent of movement produced by the cam $j$. The upper part $i^3$ of the lever is pivoted to the lower part $i^2$ and has a break-joint connection therewith. A spring $i^4$ is employed to hold the parts $i^2$ $i^3$ normally in alinement, said spring being stiff enough to insure the full return stroke of plunger I' when the lever is moved backward unless the plunger is positively arrested. Part $i^3$, however, must always move forward or to the right with part $i^2$.

Figure 10:
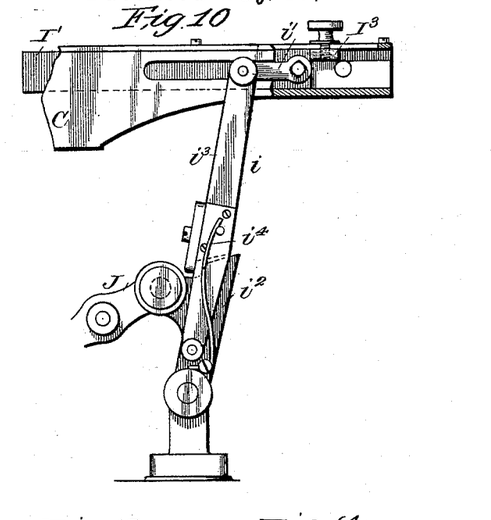
Fig. 10 is a detail view of the adjustable line-pusher.
Figures 11, 12, 13, 14, 15:
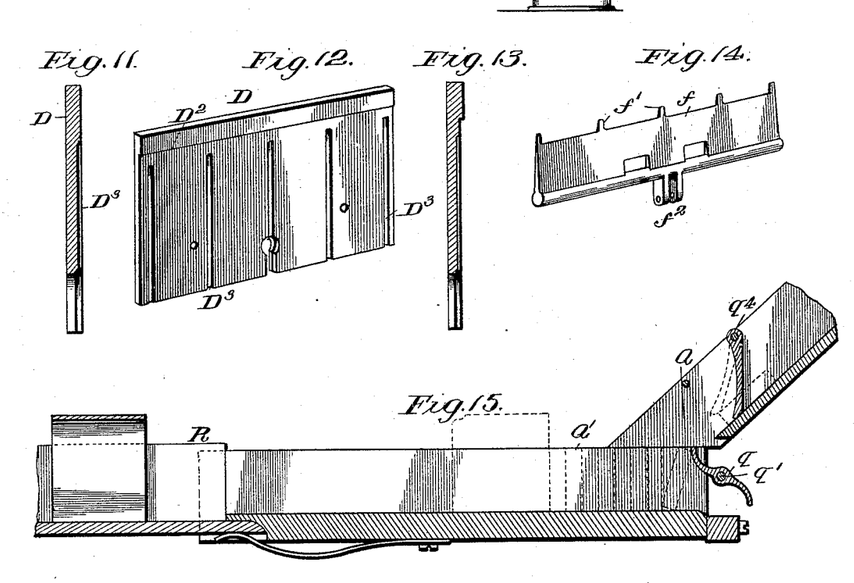
Figs. 11, 12, and 13 are detail views of the line-lifter plate.
Fig. 14 is a detail view of the lead-stacker plate.
Fig. 15 is a detail sectional view of the quad-stacking mechanism.

The swing of the lever $i$ is sufficient to impart a movement to the plunger I' equal to the greatest width of the galley, for when the galley is narrowed by adjusting-guides $a$ it is desirable to limit the play of plunger I', so that its inner end will stop on its return movement when it reaches the left-hand side of the galley. In order to provide for this, an adjustable stop I³ may be employed, as indicated in Fig. 10, and this stop will arrest the return movement of the plunger I' at the desired point, and thus, owing to the jointed connection between part $i^2$ $i^3$ of lever $i$, part $i^2$ can continue to swing backward, while the upper end of part $i^3$ is stopped.

Between the uprights B' and B³ the casting C has a transverse horizontal slot or opening C³ in it, which intersects channel I', so that at this point the said channel has merely a slight formation at bottom and top and both sides are entirely open, there being just enough groove left at top and bottom of the channel to retain a letter or face-type, while a space or quad could be pushed laterally out of the channel.

Figure 4:
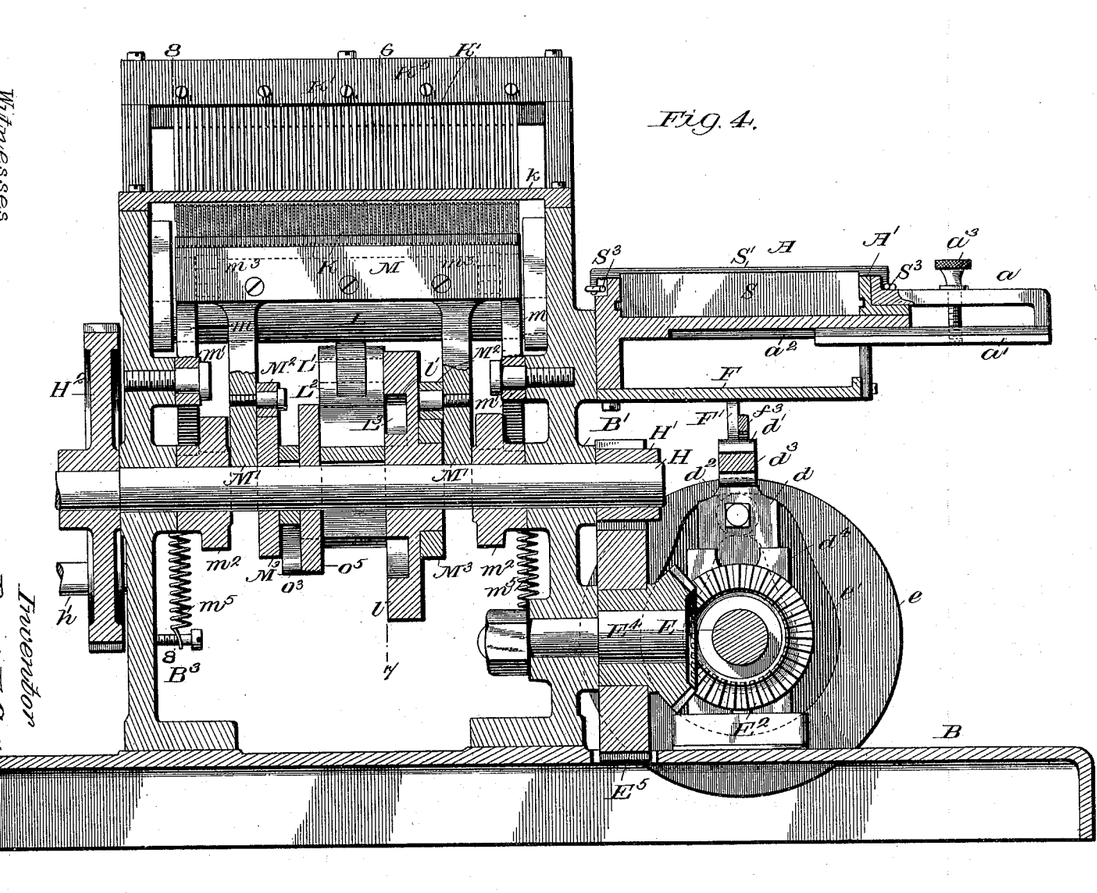
Fig. 4 is a longitudinal section on line 4 4, Fig. 1.
Figure 8:
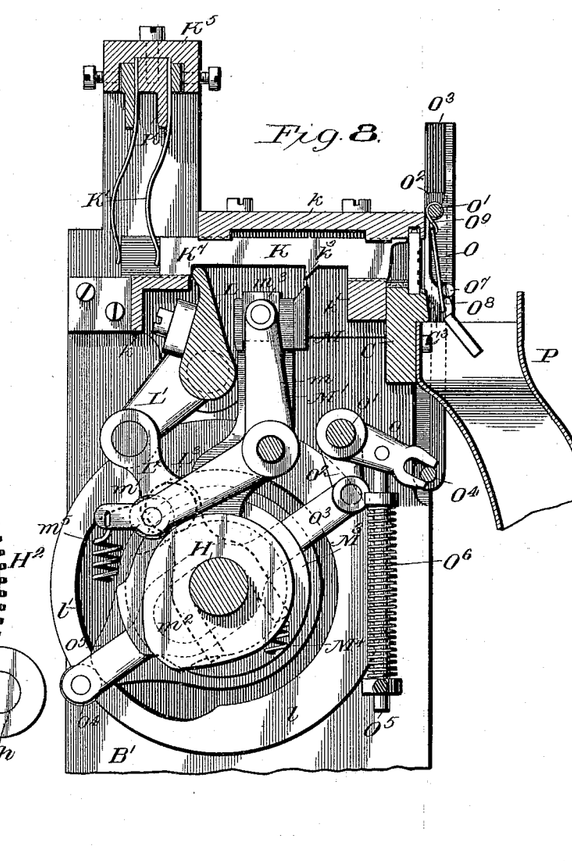
Fig. 8 is a transverse section on line 8 8, Fig. 4, looking in the direction of the arrows.
Figure 9:
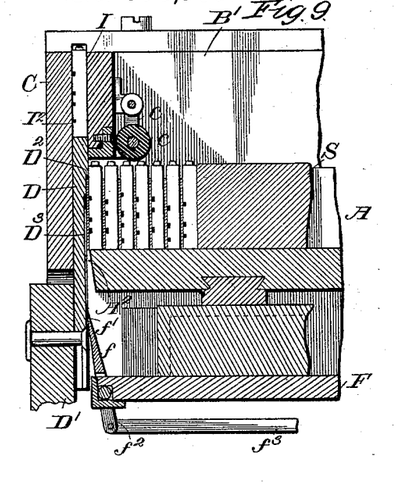
Fig. 9 is an enlarged sectional view of the line-lifting and lead-stacking mechanism.

A number of sliding ejectors K are arranged in a horizontal parallel series directly in front of opening C³ and are confined between a top plate $k$ and bottom bar $k'$, suitably supported on the standards B' B³, said bars being transversely milled on their opposite faces, so as to form guides for said ejectors, by which they are held close together and in proper alinement, as indicated in Fig. 4. Half the the ejectors are shorter than the others, and the short ejectors alternate with the longer ones, and each ejector is pressed forward toward channel I by means of springs K', which are clamped between plates K², K³, and K⁴, held in a channel-bar K⁵, suitably supported on the standards above the rear end of the ejectors, so that each ejector has an independent controlling-spring. Each ejector is notched on its under side, forming a shoulder K⁷, which is adapted to engage a controller-plate L, by which all of the ejectors are simultaneously retracted out of the way of the type in channel I and are locked in position until the controller-plate releases them, as hereinafter explained. This controller-plate L is provided with a depending arm L', which is pivotally connected to one end of a cam-lever L², the other end of which is slotted to embrace shaft H, and said lever is provided with a friction-roller L³, which engages cam-groove $l'$ in the face of a disk $l$, fast on the shaft H, as shown in Fig. 8. Each ejector K is also provided with a "feeler-tooth" $k^4$ on its front end, (corresponding in function to the feelers $w^3$ in my Patent No. 550,553,) and each ejector is also provided with a depending tooth $k^3$ on its lower edge and in rear of bar K', which is adapted to be engaged by a pusher-bar M, mounted on the upper ends of movable bars M', the lower ends of which are slotted and embrace shaft H, and each bar is provided with a cam-roller M², by which they are supported upon the peripheries of cams M³, made fast to shaft H, so that as said shaft rotates the bar M is raised and lowered. In addition the pusher-bar is moved laterally by means of levers $m$, respectively pivoted on the uprights B' B³, and their lower arms carry cam-rollers $m'$, which run upon the peripheries of cams $m^2$, fast on shaft H, as shown, and their upper ends are pivoted to blocks $m^3$, which slide in vertical grooves in the ends of the bar M, as shown, the construction being such that the pusher-bar is given a gyratory motion, it being first raised, then moved rearward, then lowered, and finally moved forward to original position. The bars $M^2$ are held down by springs $M^4$, so as to keep their rollers $M^2$ in contact with the cams $M^3$, and springs $m^5$ are connected to the lower arms of levers $m$, so as to hold their rollers $m'$ in close contact with cams $m^2$.

The operation of the above-described space and lead discarding portion of the invention will be obvious to any one familiar with my aforesaid patent, and, briefly, the leaded dead-matter is placed in galley A, the follower S placed in front of the same, and the weight attached thereto, so that the plunger will force the dead-matter rearward and against casting C or the plate D, if it be raised. At each revolution of shaft E plate D is reciprocated. Starting with the plate in its lowest position a line of type will be brought directly over it and under channel I in casting C. After plunger I' is retracted plate D rises and elevates the superimposed line of type into channel I and holds it there until plunger I' pushes the line of type to the right and in front of the ejectors. Then plate D descends, and in so doing ledge $D^2$ thereon catches a lead and pulls it down through slot $A^2$ out of the galley, and stacker $f$ subsequently moves the lead onto the shelf F. When a line of type in channel I stops opposite the ejectors, the controller L is rocked, so as to release the ejectors, and their springs immediately force them backward against the line of type standing in the opening $C^3$ of the channel I. If any feeler $K^4$ strikes a type, its ejector is prevented from going farther backward; but if any feeler finds an opening above a space or quad it allows its ejector to move backward, so that its tooth $k^3$ passes in rear of the rear edge of pusher M when the latter is in its normal position. Then pusher M rises and moves rearward, catching the tooth $K^3$ of such projecting ejector and forcing the latter rearward, forcibly ejecting the space or quad from the line of type. Then pusher M is lowered out of the way, and the controller moves back to first position, drawing all the ejectors forward out of the way of the type, which are subsequently moved along in the channel. The shaft H makes several revolutions to each revolution of shaft E, the cam $j$ being so constructed that it imparts a forward movement to the plunger I' each time the controller pulls the ejectors out of the way, and thus as the line of type passes the ejectors it is repeatedly subjected to the searching action of the feelers, and every space or quad is discarded before the type passes opening $C^3$.

In order to prevent any spaces or quads being caught between adjoining types and prevented from falling entirely out, the striker-plate O may be used. This plate lies in rear of opening $C^3$ and normally stands above the opening and out of the way. It is attached to a rod O', which is pivoted in the upper ends of sliding bars $O^2$, that are held in guides $O^3$. The lower ends of bars $O^2$ are connected by a rod $O^4$, which is loosely embraced by bifurcated levers $o$, fixed on a rock-shaft $o'$, which is rocked at the proper time by means of a crank-arm $o^2$ and cam-lever $o^3$, which is slotted to embrace shaft H and has a cam-roller $o^4$ on one end bearing upon the periphery of a cam $o^5$, attached to shaft H, as shown. The striker is normally pressed upward by means of rods $O^5$ and springs $O^6$, as indicated in the drawings. After the ejectors have operated and while they are retracted out of the way striker O is lowered and its lower edge passes behind any projecting or displaced spaces or quads, and as the striker O nears its lowest position cam-lugs $O^7$ thereon contact with cam-surfaces $O^8$ on the guides, by which the lower end of the striker is swung rearward, as indicated in Fig. 8, thus effectually and positively removing all the displaced spaces and quads from the line. As the striker O rises it is swung forward by means of springs $O^9$, attached to rod O', as shown.

*The space and quad separating device.*— The ejected spaces and quads fall into a chute P, by which they are directed into the upper end of an inclined rotary separator P', which is composed of a series of longitudinal rods or bars $p$, connected to rings $p'$, which rings are supported and guided upon rollers $p^2$, attached to brackets $p^3$, made fast to the rear edge of the base. The barrel can be rotated by means of a chain or belt encircling it and driven from a grooved pulley $H^4$ on the rear end of shaft H, as shown. As the spaces and quads descend through the separators the spaces fall out between the rods $p'$ into a suitable receptacle, from which they can be returned to the melting-pot, while the quads escape from the lower end of the separator into a conveyer Q, that directs them to an assembling-channel Q', into which they are forwarded by a radial pusher $q$ on the end of a stud-shaft $q'$, driven by means of a pulley $q^2$ and belt $q^3$ from a pulley $h^7$ on the end of shaft $h'$, as shown. A dog $q^4$ is pivoted in the chute Q just above the pusher, so as to compel the quads to drop properly in position before it.

A detachable type-holding channel or reservoir section R may be placed in position to receive the quads from channel Q', and a like channel may be placed in position to receive the face-type from channel I, substantially as described in my Patent No. 550,553 aforesaid, these type-channels forming, however, no part of my present invention and being fully shown and described in some of my former Letters Patent.

Having thus described my invention, what I therefore claim as new, and desire to secure by Letters Patent thereon, is—

1. The combination of mechanism for discarding spaces and quads from a line of type, and means for feeding a line of type to said mechanism; with means for separating the quads from the spaces after they are removed from the line of type.

2. The combination of mechanism for discarding spaces and quads from a line of type, and means for separating lines of type from dead-matter and feeding them to said mechanism; with means for separating the quads from the spaces after they are removed from the type, substantially as described.

3. The combination of mechanism for discarding spaces and quads from the line of type, and means for feeding lines of type to said mechanism; with mechanism for separating the quads from the spaces after they are removed from the line of type, and means for assembling the discarded quads, substantially as described.

4. The combination of mechanism for separating lines of type from dead-matter, and for discarding the leads therein; with mechanism for subsequently discarding the spaces and quads from the separated lines of type and mechanism for separating the quads from the spaces, substantially as and for the purpose described.

5. The combination of mechanism for discarding the leads from dead-matter and for separating the lines of type therein; with mechanism for subsequently discarding the spaces and quads from the separate lines of type, means for separating the quads from the spaces, and means for assembling the separated quads, substantially as and for the purpose described.

6. The combination of a dead-matter galley having a transverse slot in its rear end, means for forwarding dead-matter in the galley toward said slot, and a lead-holding shelf below the galley; with a reciprocating plate having a ledge on its front face adapted to engage the leads in the dead-matter and pull the same down through said slot when the plunger descends, and a rocking stacker-plate below said slot and between said reciprocating plate and said shelf adapted to remove the leads from the plate and stack them on the shelf, and means for rocking said plate, substantially as described.

7. The combination with a galley having a slot in its rear end, the plunger-plate adapted to lower leads from the galley through said slot, provided with vertical grooves, and a rocking stacker-plate having fingers adapted to rest in said grooves and strip the leads from the plunger and stack the same in the lead-holder.

8. The combination with a galley having a slot in its rear end, a lead-holding shelf below the galley and the plunger having a plate adapted to lower leads from the galley through said slot, and provided with vertical grooves; with a rocking stacker having fingers adapted to rest in said grooves and strip the leads from the plunger and stack the same on the shelf, and mechanism for operating said stacker, substantially as described.

9. The combination of a dead-matter galley having a transverse slot in its rear end, a lead-holding shelf below the galley, a type-channel above the slot therein, and means for forwarding dead-matter in the galley toward said slot, with a vertically-grooved reciprocating plate having a ledge on its front face adapted to engage the leads in the dead-matter and pull the same down through said slot into the type-holder when the plate descends, and adapted when it ascends to lift the line of type into the type-holder, and a rocking stacker-plate below said slot having fingers adapted to engage the grooves of the stacker and remove the leads from the plate and stack them on the shelf, substantially as described.

10. The combination of the type-line holder, and a series of parallel independently-removable sliding ejectors provided with feelers; with means for positively actuating any ejector that has found a space or quad to cause it to eject the same from the line, substantially as described.

11. The combination of the type-line holder, and a series of parallel independently-removable sliding ejectors; with a gyratory pusher adapted to engage and positively actuate any ejector that has found a space or quad to cause it to eject the same from the line, substantially as described.

12. The combination of the type-line holder, and a series of parallel sliding ejectors provided with feelers; with means for positively actuating any ejector that has found a space or quad to cause it to eject the same from the line, mechanism for returning said ejectors to normal position, and means for moving the type-line forward past the ejectors while they are retracted, substantially as and for the purpose described.

13. The combination of the type-line holder, a series of parallel independently-removable sliding ejectors provided with feelers, and a gyratory pusher for positively actuating any ejector that has found a space or quad and to cause it to eject the same from the line, a vibrating controller for returning said ejectors to normal position, and means for moving the type-line forward past the ejectors while they are retracted, substantially as described.

14. The combination of a type-line holder having an opening in its side; a series of parallel sliding ejectors opposite said opening, the grooved guides for said ejectors and springs adapted to push said ejectors toward the opening; with means for withdrawing said ejectors from the slot, and a gyratory pusher adapted to engage any of the ejectors that has found a space or quad and cause it to positively eject the same, substantially as described.

15. The combination of means for holding a line of type, means for tilting spaces or quads from the line, and means for positively knocking out of the line the tilted spaces or quads.

16. The combination of a type-line holder, a series of space-ejectors beside the holder, means for actuating any ejector that finds a space or quad, and a striker adapted to knock out all the spaces or quads tilted over by the ejectors, substantially as described.

17. The combination of a type-line holder, a series of parallel space-ejectors beside the holders having feelers on their ends adapted to press against the type in the holder; and means for actuating any ejector whose feeler finds a space; with means for holding said ejectors out of the way of the type when the latter is moving in the holder; and a striker-plate adapted to knock out all the spaces or quads tilted over by the ejectors.

18. The combination of a type-line holder, a series of space-ejectors, springs for pressing said ejectors against the type, a controller for holding said ejectors away from the type, except at the moment of their operation; and a striker adapted to positively remove all spaces and quads tilted from the line of type by said ejectors.

19. The combination of a type-line holder, a series of space-ejectors, springs for pressing said ejectors against the type and a controller for holding said ejectors away from the type, except at the moment of their operation; with means for operating any ejector that finds a space, and a movable striker-plate adapted to knock out all spaces and quads tilted from the line of type by said ejectors.

20. The combination of a type-line holder, a series of sliding parallel space-ejectors, a controller for holding the ejectors away from the type except at the moment of their operation, and a gyratory pusher for positively operating any ejector which has found a space or quad; with a striker adapted to positively eject any spaces or quads tilted from the line by the ejectors, all substantially as described.

21. The combination of the type-line holder, a series of parallel sliding space-ejectors, individual springs for pressing each ejector against the type, and a single controller for holding the ejectors away from the type, except at the moment of their operation; with a vertically and laterally movable bar adapted to engage any ejector which has found a space or quad and cause it to positively eject the latter from the line, and a vertically-movable swinging striker adapted to engage any partially-ejected spaces or quads and remove them from the line, substantially as described.

22. The combination of a type-line holder and means for moving the line of type therein, a series of parallel ejectors provided with feelers adapted to engage the type, and springs for pressing said ejectors toward the type, a controller-plate for withdrawing said ejectors from the type except at the moment of their operation and means for operating said plate; with a pusher-bar vertically-movable cam-actuated bars carrying said bar, and the cam-actuated levers engaging said bar and adapted to cause it when lifted to positively operate any ejector which has found a space or quad, for the purpose and substantially as described.

23. The combination of a type-line holder having an opening past which a line of type is passed, ejectors beside said slot adapted to detect and eject spaces and quads from the line of type; with a vertically-movable and laterally-swinging plate adapted to engage any spaces or quads tilted from the line by said ejectors, and positively remove them, for the purpose and substantially as described.

24. The combination with a type-line holder and mechanism for tilting spaces or quads from the lines of type therein, with a vertically-movable and laterally-swinging plate, and mechanism for lowering said plate, so as to cause it to engage any spaces or quads tilted from the line of type, and means for causing said plate to swing outwardly when lowered so as to positively eject such spaces and quads.

25. The combination with mechanism for ejecting spaces and quads from a line of type, of means by which the ejected spaces are separated from the quads.

26. The combination with mechanism for ejecting spaces and quads from a line of type, of a rotatable cage-separator into which the ejected spaces and quads are delivered, and by which the spaces are separated from the quads, and a conveyer at the discharge end of said cage into which the quads are delivered, a channel at the lower end of said conveyer, and mechanism for stacking the quads in said channel.

27. The combination of the dead-matter galley, the lead-supporting shelf, and a reciprocating plunger adapted to transfer leads from the galley to the shelf; with a pivoted stacker-plate adapted to strip the leads from the plunger and stack them upon the shelf, a rotary shaft having an eccentric-pin on its end, a vertically-movable rod having a loop in which said pin works, a spring for uplifting said rod, and connections substantially as described between the upper end of said rod and said stacker, substantially as described.

28. The combination of the galley, a reciprocating plunger for removing lines of type therefrom, an oscillating lever for operating said plunger, a bifurcated slide-bar engaging said lever, a grooved cam for operating said bar mounted upon a rotatable shaft, and a guide for said slide, substantially as and for the purpose described.

29. The combination of the galley, means for forwarding "dead-matter" therein, a reciprocating plunger for removing lines of type therefrom, and an oscillating lever for operating said plunger; with a bifurcated slide-bar engaging said lever, a grooved cam for operating said bar mounted upon a rotatable shaft, and a guide for said slide, said shaft passing through openings in said guide and slide-bar, for the purpose and substantially as described.

30. The combination of a type-line holder, a series of ejectors adapted to detect and eject spaces and quads from the line of type, and means for operating said ejectors, and a striker-plate adapted to positively remove all spaces and quads tilted from the line by the ejector; with means for moving a line-type step by step past said ejectors, so that it shall be repeatedly subjected to the action thereof, substantially as described.

31. The combination of a type-line holder having an opening past which a line of type is passed, a series of ejectors beside said opening adapted to detect and eject spaces and quads from the line of type, and means for operating said ejectors; with a line-pusher, a vibrating lever for operating said pusher and a cam for oscillating said lever, said cam having a series of dwells, whereby the lever is caused to move the line of type intermittently or step by step past said opening, so that it shall be repeatedly subjected to the action of the ejectors, substantially as described.

32. The combination of the galley having a fixed side and a movable side and transverse grooves in its bottom dovetailed in cross-section; with guides adapted to embrace the bottom of the galley having their upper portions made fast to the movable side and their lower portions dovetailed in cross-section and engaging the grooves in the bottom of the galley, and clamping-screws attached to the guides, substantially as described.

33. The combination of the vertically-movable pusher-bar having slots in its ends, the vertically-movable bars carrying said pusher-bar, and means for raising and lowering said bars; with pivoted levers having blocks pivoted on their ends and sliding in the grooves in the ends of the pusher-bar and means for oscillating said levers for the purpose and substantially as described.

34. The combination of the vertically-movable pusher-bar having slots in its ends, the vertically-movable bars carrying said pusher-bar having their lower ends slotted to embrace a rotary shaft and cams on said shaft for raising and lowering the said bars; with pivoted cam-levers having blocks pivoted on their upper ends and sliding in the grooves in the ends of the pusher-bar, and cams on said shaft for oscillating said levers, all for the purpose and substantially as described.

35. The combination with a type-line channel, mechanism for feeding lines of type thereto and a plunger for forwarding lines of type therein; of a break-lever for operating said plunger, having a lower part pivoted to a fixed support and connected to a cam-actuated lever, and an upper part pivoted on the lower part and held in alinement therewith by springs, the upper part being also connected to the plunger, for the purpose and substantially as described.

36. The combination of a type-line holder, a plunger for forwarding lines of type therein, a break-lever for operating said plunger, said break-lever consisting of a lower part pivoted on the fixed support and an upper part pivoted on the lower part and connected by links to the plunger and held in alinement with the lower part by means of springs; with an adjustable stop for limiting the movement of the plunger thereby arresting the movement of the upper portion of the lever, and means for imparting a uniform swing to the lower portion of the lever, substantially as described.

In testimony that I claim the foregoing as my own I affix my signature in presence of two witnesses.

PAUL FLEMMING COX.

In presence of—
  E. N. MACADAMS,
  F. A. CRAPO.